Figure 1:
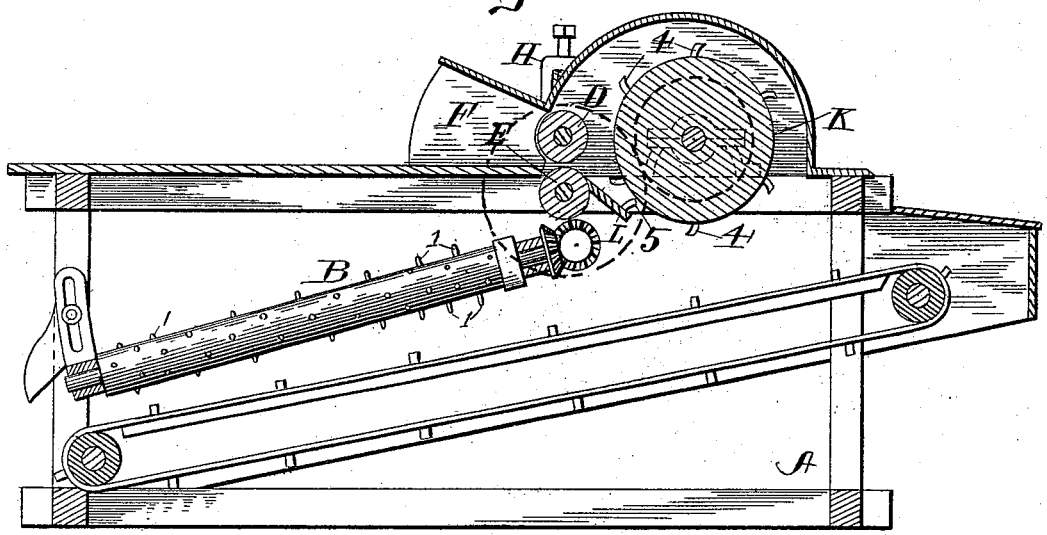

(No Model.)

G. W. PACKER.
COMBINED CORN HUSKER AND FODDER SHREDDER.

No. 494,511. Patented Mar. 28, 1893.

Witnesses:
C. C. Burdine
H. P. Wilson

Inventor
George W. Packer,
per Jno. T. Manahan
atty

UNITED STATES PATENT OFFICE.

GEORGE W. PACKER, OF ROCK FALLS, ASSIGNOR TO THE KEYSTONE MANUFACTURING COMPANY, OF STERLING, ILLINOIS.

COMBINED CORN-HUSKER AND FODDER-SHREDDER.

SPECIFICATION forming part of Letters Patent No. 494,511, dated March 28, 1893.

Application filed October 27, 1891. Serial No. 409,998. (No model.)

*To all whom it may concern:*

Be it known that I, GEORGE W. PACKER, a citizen of the United States, residing at Rock Falls, in the county of Whiteside and State of Illinois, have invented certain new and useful Improvements in a Combined Corn-Husker and Fodder-Shredder; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention has reference to improvements on combined corn huskers and fodder shredders, and consists of two departments:— First, in a combination of devices for shredding the corn fodder, after the ears are snapped therefrom. Second, in successively and gradually decreasing the altitude of the peripheral projections of the husking rollers, from the upper ends to the lower ends of said rollers.

Referring to the first department of my invention, it is well known that there is a great deal of nutrition in corn stalks, and efforts have been made to reduce the stalk to such a condition that it can be utilized, but so far, without its being a practical success. In chopping the fodder or stalk by lateral or diagonal cuts, the short pieces thus formed have such sharp ends that the animal cannot chew them, owing to the fact that the pieces assume a vertical position in the mouth of the animal, and lacerate or cut the lining of its mouth to such an extent as to cause soreness and pain and therefore the animal will reject the larger portion and will eat no more than will partially appease its hunger. Another objection to this process is in the fact that there is more or less inconvenience in handling, as the pieces are too short to be handled with a fork, and too light and loose to be handled with a shovel.

In order to properly and successfully shred corn fodder, the stalks must be fed forward at a regular rate of speed and at the same time they must be held back from the teeth of the shredding cylinder, so that the stalks will be shredded into fine pieces, which can be handled substantially the same as hay or straw, and which will then be eaten by the animals. Efforts have been made to accomplish this result by causing the stalks to pass from the rollers directly onto a flat plate, and then operating upon them by a toothed, macerating cylinder, which revolves directly above the plate. But in this construction it is found that, in adjusting the feed rollers so as to permit the butt or larger end of the stalk to pass through, they will not engage with the smaller portions of the stalk, and consequently as soon as the larger end has passed between the rollers and been acted upon by the toothed cylinder, the remainder of the stalk will be drawn through the rollers by the rapid movement of the toothed cylinder without being shredded at all, owing to the fact that as soon as the rollers do not hold the stalk, one of the teeth of the toothed cylinder will catch in the stalk and jerk it forward, without any resistance from the feed rollers. Another disadvantage arising from this construction is in the fact that the stalk is enveloped in a thick hard shell, having a smooth exterior surface, the lower portion of which rests directly upon the plate, and which is so thin that it will pass between the ends of the teeth and the plate without being penetrated by the teeth of the macerating cylinder, and therefore a large portion of that side of the shell of the stalk is passed through without being acted on, and even that which is acted upon is in long stringy pieces, and much of it not in a condition for the cattle to eat. It is also found that, by by reason of this hard cylindrical shell, unless the teeth of the macerating cylinder strike directly over the center of the stalk they will fail to pass through the shell. And it is also found that when the stalks are supported on a smooth flat plate, without any teeth or pins to prevent them from being thrown to one side when the teeth of the cylinder strike the stalk on one side of its center, they will throw it first in one direction and then in the other, laterally, upon the plate without breaking the shell or tearing the stalk. In this manner the stalk is whipped back and forth across the plate and is only imperfectly torn, or split into long strips, and as it is constantly fed forward by the feed rollers, it passes through the machine without an opportunity for the teeth of the cylinder to act upon the stalk long enough to completely shred the stalk, or reduce it to such a condition as to be in a desirable condition for feed. To obviate these defects, I have constructed a machine in which the stalks are fed to the cylinder in substantially a radial plane thereto, so that the end of the stalk is presented in such a manner that the teeth of the cylinder can pass entirely through it and split it open from top to bottom. As it is thus acted upon by the teeth of the cylinder, the stalk is bent down by the cylinder into the concave, so that the teeth of the cylinder and the teeth of the concave contact upon the stalk until it has passed entirely through the concave, the cylinder and concave being so close as to bring the teeth of the cylinder and concave in contact with every small particle of the stalk, and consequently the stalk is torn up and delivered from the machine in a finely shredded condition. By being bent down into the concave, it is evident that the angle formed between the line of travel between the cylinder and the concave, and the direction of the stalk passing through the feed rollers is such that after the butt, or larger portion of the stalk, has passed between the feed rollers, the bend of the stalk will prevent the top, or smaller portion of the stalk, from being drawn through the concave without being shredded. It is also evident that the teeth in the concave will prevent any lateral movement of the stalk, so that even should some of the teeth of the cylinder not strike the stalk directly in the center, it will be impossible for the stalk to be thrown laterally, on account of the teeth of the concave, hence the teeth of the cylinder will pass entirely through the stalk, in whatever position they may strike it, and the stalk is retained within the concave during the time the shredder cylinder is making several revolutions, so that every portion of the stalk will be acted upon and the result will be that it will be torn into fine pieces which will be eaten by the animals as readily as any other food, and which can be baled in the same manner as hay or straw and can be shipped and stored in the same manner, thus making a commercial product out of an article that is now permitted to go to waste.

Referring to the second department of my invention, it has been usual to have the projections upon the husking rollers, of substantially the same length or height. The ear drops near the upper end of the husking rollers, and when it is there engaged by the roller's projections it is inclosed with the normal quantity of husks; but as the ear passes down the incline of the husking rollers, the husks are gradually stripped from the ear, and the husking projections of the lower portion of the husking rollers, heretofore being as high as the others, had the effect of engaging the kernels of the corn, and shelling them more or less from the cob.

In my invention it is the intention to gradually decrease the length or height of these husk engaging projections upon the husking rollers, from the top to the bottom of the latter, and proportionately with the decrease of the thickness of the husks upon the ears, so that by the time the ears have reached the lower end of the husking rollers, and is substantially denuded of its husks, the lower projections will not be of sufficient altitude to engage the kernels of corn, but simply sufficient to remove the last of the husks or the silk which may be remaining upon the ears. I attain these results by the mechanism illustrated by the accompanying drawings in which—

Figure 2:
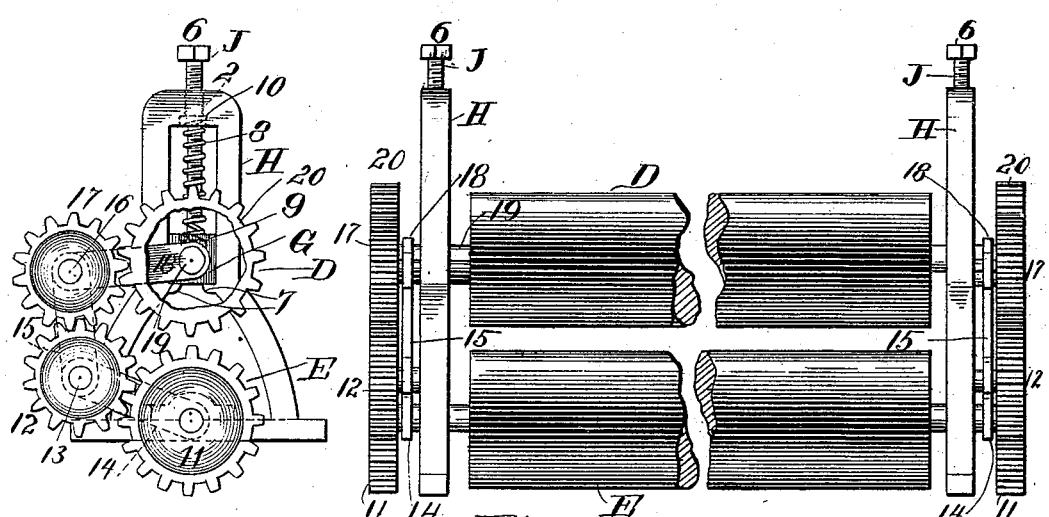

Figure 1. is a vertical longitudinal section of a machine embodying my invention. Fig. 2. is a detail of the mechanism for permitting the vertical adjustment of the upper feed roller when the machine is used for shredding ensilage.

Similar letters and figures refer to similar parts throughout both the views.

As the general form and relation of parts of the machine embodied in my invention are similar to analogous machines in use, I do not deem it necessary to show or describe the entire machine, but only such parts thereof as will illustrate the location and operation of my improvements.

A. is the general frame of the machine, in the lower portion of which are suitably journaled the husking rollers B. lying parallel in pairs in the usual mode. In the periphery of the rollers B. are rigidly seated the husking projections 1. distributed as may be desired, spirally or otherwise, over the outer surface of said rollers and projecting from the outside of said rollers in a gradually less degree from the upper end to the lower end of said rollers, having their maximum height at their upper end and their minimum height at the lower end of said rollers.

C. is the ordinary elevator seated beneath the husking rollers to carry away the husked ears, and is here inserted simply to show the relative position of the parts.

D. is the upper feed roller, and E. the lower one, to which through the horizontal hopper F. is fed the corn stalks in the usual mode. The boxes containing the journals of the lower roller E. are seated unalterably so that the altitude of said lower roller remains the same under all conditions of use. The upper feed roller D. is journaled at each end in boxes G. which are suspended beneath a bracket H. suitably fastened to the upper portion of the frame A. A vertical screw J. is projected vertically down through the horizontal top of the bracket H. and is adapted to rotate in threads 2. formed in said bracket, and is provided at its upper end with the cross or thumb piece 6. by means of which the screw J. is rotated for the purpose of permitting the adjustability of the rollers D. at any desired altitude above the roller E. and the roller D. may by means of the supporting rod J. be screwed down into contact with the upper surface of the roller E. as follows: Lugs 7. formed on the inner surface of bracket H. limit the downward movement of the journal boxes G. of rollers D. A spiral spring 8. is seated around the screw J. and inserted at its lower end in a recess 9. formed in the upper surface of the box G. and at its upper end in a recess 10. formed in the lower surface of the upper end of the bracket H. When it is desired to hold the box G. down firmly upon lugs 7. (which is the position for snapping the ears from the stalks) the screw bolt J. is turned down until its lower end presses box G. down to lug 7. and holds said box there. When the rollers D. and E. are used merely to advance feed and have no ear snapping to do, the bolt J. is withdrawn to any desired height and the box G. is held adjustably in the space between lugs 7. and the then lower end of bolt J. by the spring 8.

The gear wheel 11. is rigidly seated on roller E. said roller being driven in any suitable mode, from its other end. The wheel 11. engages and rotates an intermediate gear wheel 12. which latter rotates loosely on a transverse shaft 13. suspended on two arms 14. pivotally attached at one end to shaft 13. and their opposite ends being pivotally seated on the shaft of gear 11.

Arms 15. are severally pivotally seated, at their lower ends on shaft 13. near the ends of the latter shaft and are projected upward and are pivotally attached at their upper ends to, and support a transverse shaft 16. on which the second intermediate gear 17. loosely revolves. Arms 18. similar to arms 14. and 15. are pivotally attached at their respective ends to shaft 16. and the shaft 19. of roller D. and hold gear 17. in mesh with gear 20. which is rigidly seated on roller D.

Gear 11. engages and actuates gear 12. the latter engages and actuates gear 17. and the latter communicates its rotation to gear 20. on feed roller D. As roller D. is raised by the bulk of the feed, as aforesaid, arms 14. and 18. draw the intermediate gears 12. and 17. toward gears 11. and 20. and therefore gear 20. is driven constantly from gear 11. whatever may be the altitude of roller D.

On the frame A. on the side of the feed rollers opposite the hopper F. is suitably journaled a cylinder K. provided peripherally with projecting spikes or teeth 4. similar to those used on thrashing machine cylinders. Also in the upper portion of the frame A. is rigidly seated the concave L. provided on its upper surface with upwardly projecting teeth 5. in such number and position as will be found adapted for the operation hereinafter named.

The teeth 4. and 5. are so relatively arranged as that in the rotation of the cylinder K. the teeth 4. pass between, and close to the teeth 5.

The periphery of the cylinder K is driven at a greater rate of speed than the peripheries of the feed rollers D, E, in any suitable manner, as by driving the feed rollers from the cylinder by means of gearing of different sizes, as shown in heavy dotted lines in Fig. 1. As the stalks are fed lengthwise between the rollers D. and E, and the plane of rotation of the teeth 4 of cylinder K is in the line of said feed, the first operation of the cylinder K is to split the stalk longitudinally, and tear it into shreds, which are then subjected to the subsequent co-action of the teeth of the cylinder and the teeth of the concave, the product being of a soft, pliable character, something like hay, conveniently handled with ordinary forks. Said product is also in such condition that the animals can eat it as readily as they would hay, and the entire stalk is eaten by them.

The operation and advantage of my invention in shredding the fodder are that the slower movement of the feed rollers, as compared with that of the cylinder, has the effect of holding the stalks against the drawing action of the teeth of said cylinder, and the aforesaid co-action of the teeth of the cylinder and of the concave, whereby the stalks are split into finely shredded condition. All of the parts named, that is to say; the feed rollers rotated at a certain velocity, the spiked cylinder rotated at a greater velocity, and a stationary concave provided with teeth 5, are absolutely and equally indispensable to the production of shredded corn fodder.

What I claim as my invention, and desire to secure by Letters Patent of the United States, is—

1. In a corn shredder, the combination and co-operation of the following three elements;—a cylinder K provided on its periphery with teeth 4, co-acting feed rollers, D. E, located in front of said cylinder, each of said feed rollers being positively driven at a less surface velocity than the surface velocity of the cylinder and being adjustably held together with such degree of pressure as to prevent the stalks, while passing between them, from being drawn faster than their own surface velocity, and a concave L located out of the radial plane between the center of the cylinder K and the contacting or operating portions of the surfaces of the feed rollers, whereby the material must be bent out of its line of travel in passing from the feed rollers to the concave, said concave being provided with teeth 5 projected upwardly into the intervals between the line of movement of the several teeth 4 of the cylinder, substantially as set forth.

2. The husking rollers B. provided peripherally with projections 1. gradually decreasing in altitude from the upper to the lower end of said rollers, substantially as shown and for the purpose described.

In testimony whereof I affix my signature in presence of two witnesses.

GEORGE W. PACKER.

Witnesses:
JOHN G. MANAHAN,
HENRY C. WARD.